UNITED STATES PATENT OFFICE.

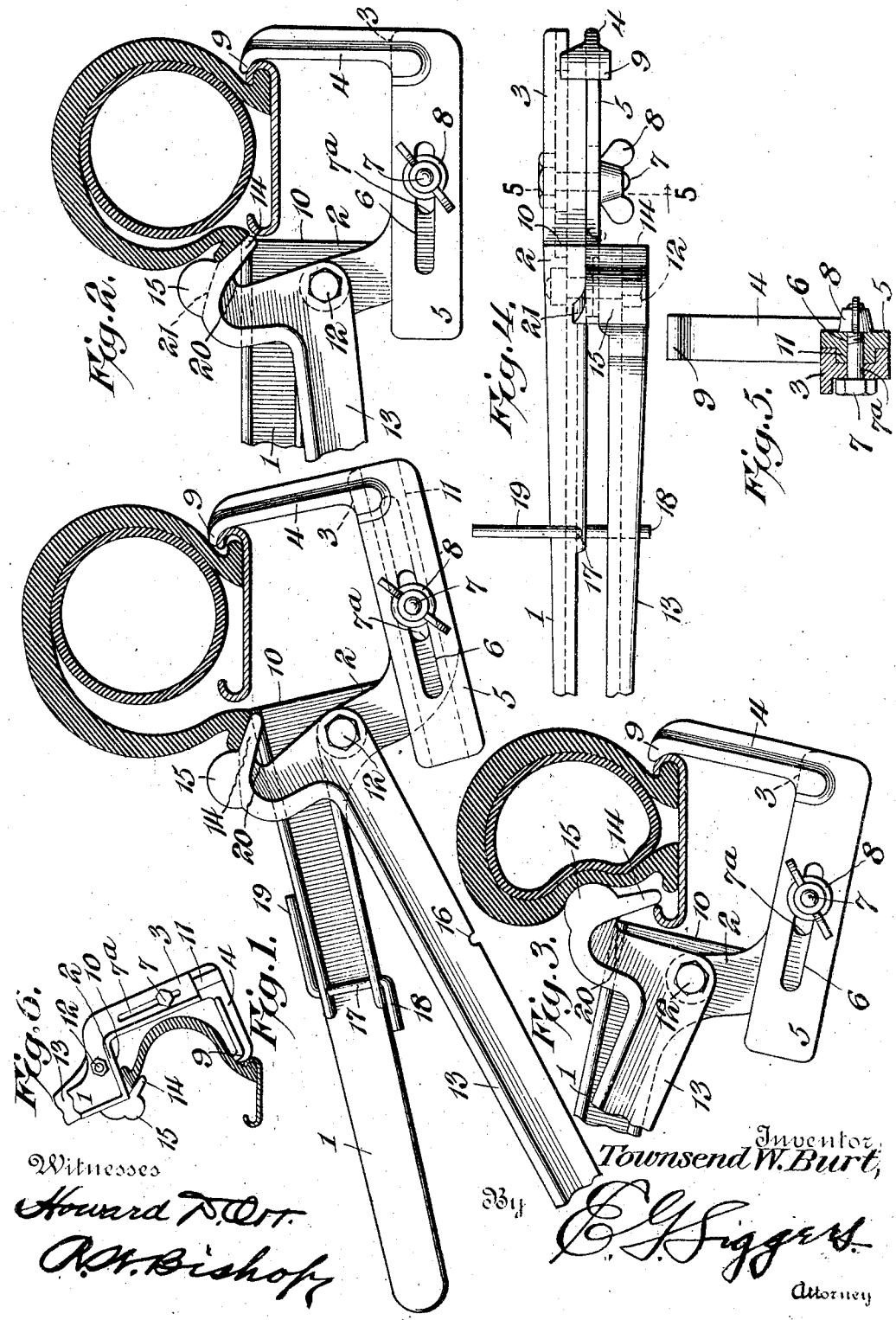

TOWNSEND W. BURT, OF HEMPSTEAD, NEW YORK.

TIRE-APPLYING TOOL.

1,003,030.

Specification of Letters Patent. Patented Sept. 12, 1911.

Application filed March 15, 1910. Serial No. 549,537.

*To all whom it may concern:*

Be it known that I, TOWNSEND W. BURT, a citizen of the United States, residing at Hempstead, in the county of Nassau and State of New York, have invented a new and useful Tire-Applying Tool, of which the following is a specification.

This invention is a tool for mounting the casings of pneumatic tires upon wheel rims and consists in certain novel features which will be hereinafter first fully described and then particularly pointed out in the claims.

When mounting a pneumatic tire upon the wheel-rim of a motor-car or other vehicle, the bringing into position of the second beaded edge of the cover necessitates a very careful operation, and in the case of large pneumatic tires that have not yet been in use it requires considerable force. In order to cause the bead of the cover edge to pass into the corresponding groove of the rim by the means at present employed by chauffeurs, it is necessary to introduce a flat lever under the beaded edge which projects over the rim and to cause it to bear against the edge of the rim. It will be readily seen that the pneumatic tube is very close to this edge, which it even touches in many cases, and in particular if after considerable use the pneumatic tube has attained a diameter larger than that which it had originally. It will be evident that when an upward motion is imparted to the lever the pneumatic tube may become interposed between the bottom surface of the rim and the end of the lever, and thus risks becoming cut by the pressure exerted by the lever. In order to avoid such a contingency, one is obliged to operate with very great care and to push back the pneumatic tube, so as to prevent it from passing under the point of the lever. Notwithstanding all these precautions it frequently happens, even to the most experienced operators, to damage the pneumatic tube by means of the lever. On the other hand, the placing in position of the second beaded edge by means of the ordinary levers frequently requires the exercise of considerable force, as already stated.
The present invention relates to a special construction of lever device which avoids the two above-named inconveniences and which possesses the advantage over levers of ordinary construction of requiring a much less powerful effort for obtaining the desired result and of not damaging the beaded edge of the covering, which is only subjected to a minimum degree of tension.

In the accompanying drawings, which fully illustrate my invention, Figure 1 is a view showing my device in elevation and a pneumatic tire and wheel rim in transverse section, the device being shown in position to raise the beaded edge of the casing above the rim. Fig. 2 is a similar view showing the parts in the position immediately prior to the clearing of the rim by the tire casing. Fig. 3 is a similar view showing the casing upon the tire in position to expand and engage the channel of the rim. Fig. 4 is a plan view of the tool. Fig. 5 is a detail transverse section on the line 5—5 of Fig. 4. Fig. 6 is a diagrammatic view showing how the tool may be manipulated to hold a tire casing back from the rim while the valve of the inner tube is being inserted through the rim.

In carrying out my invention, I employ a main lever or body 1 having an L-shaped forward end comprising a stem 2 and an arm 3 extending forward from the end of the said stem. To the arm 3, I secure a rim-engaging jaw consisting of a jaw member 4 and a shank 5 at substantially right angles to the member 4 and provided with a longitudinal slot 6. The shank 5 is secured adjustably to the arm 3 by a set screw 7 and thumb nut 8, the set screw passing through the said slot and through the body of the arm 3 and the thumb nut 8 being mounted on the end of the screw to be turned home against the shank 5 so as to clamp the rim-engaging jaw firmly to the lever member or body and at the same time permit its adjustment to and from the end of the handle portion of the lever member, whereby the device may be adjusted to rims of any size. In order to increase the range of adjustment, the arm 3 is provided with a slot 7ª adapted to register with the slot 6 in the shank 5, as will be understood. The outer end of the member 4 is formed with a curved tooth 9 adapted to engage the edge of the wheel rim, as clearly shown in Figs. 1, 2 and 3, and the end of the arm 3 is somewhat reduced so as to permit the said tooth 9 to be brought into alinement with the face 10 of the stem 2, as will be readily understood on reference to Fig. 4, and, in order to further provide for maintaining the jaws in their proper relative positions, the arm 3 is constructed with a longitudinal groove which receives a longitudinal rib 11 on the shank 5 so that vibration of the said shank and its attached jaw 4, relative to the arm 3, will be prevented and the strength of the structure increased. To the side of the stem 2, at an appropriate distance from the edge of the lever 1 remote from the stem 2 I pivotally secure, by means of a bolt 12, a supplemental lever 13 having its end turned upward and formed into a tire-engaging bill or beak 14 adapted to engage the beaded edge of the tire, as shown in Figs. 1 and 2. The bill or beak 14 is of sufficient length to receive the flat edge of the tire casing, and immediately adjacent the said bill a lug or stop 15 is provided on the upper side of the supplemental lever member so as to prevent the tire casing riding upon the said lever member to thereby escape therefrom when the tool is being manipulated. The bill end of the supplemental or angle lever is long enough to project beyond the corresponding edge of the lever 1, which edge adjacent to the face 10 may be employed to engage the bead of the tire during the initial operation of the device. The supplemental lever handle is provided with a notch 16 in its under edge, and a latching bar 17 is mounted on the handle of the main body and provided with a laterally-disposed stem or terminal 18 and a handle member 19, the said terminal member 18 being adapted to engage the notch 16 and thereby hold the two levers in proper position to engage the tire casing when the tension of the same increases. The supplemental lever is also provided with a lateral offset 21 near the bill or beak adapted to engage the corresponding edge of the main lever member or body and thereby prevent the supplemental lever dropping so far below the main lever that it cannot be conveniently grasped by the operator.

When it is desired to mount a tire casing upon a wheel rim, the casing is easily fitted to one side of the rim with its beaded edge engaging the channel at that side. The tool is then brought into position, as shown in Fig. 1, with the tooth 9 engaging over the rim at that side which is engaged by the tire casing, and is extended between the spokes of the wheel so that the main lever adjacent the face 10 will engage the free edge of the casing, as shown in Fig. 1. The device is then swung upward so that the face 10 of the stem 2 will pass upward beyond the edge of the rim, the device swinging upon the tooth 9 as a fulcrum at the point where the said tooth engages the rim. The parts will thus be brought into the position shown in Fig. 2, with the bill or beak 14 of the supplemental lever engaging the edge of the casing, and a very slight further movement will cause the tire to be lifted sufficiently to clear the edge or channel of the rim. The supplemental lever is then moved upon its pivotal connection toward the main lever and the bill 14 will be thereby caused to push the edge of the casing over the edge of the rim, whereupon it will at once slip from the bill into the rim, as shown in Fig. 3. A suitable holding tool is then engaged over the edge of the rim so as to prevent the casing slipping therefrom after which the tool is removed and the operation repeated at another point until the entire casing has been mounted in position.

From the foregoing description, it will be seen that I have provided a very simple device which may be easily operated and by the use of which the tire casing will be positively and rapidly fitted upon the rim, notwithstanding the tension of the casing, which has heretofore made the operation of mounting a casing so difficult and laborious.

My device can also be utilized to hold the casing back from the rim while fitting the valve stem of the inner tube through the valve opening in the rim by reversing the tool, as indicated in Fig. 6, so that the tooth 9 will bear upon the edge of the rim at one side and the jaws 2 and 4 will span the casing while the opposite edge of the casing will be engaged in the angle 20 formed between the bill 14 and the adjacent portion of the supplemental lever member so that when the tool is swung over upon the tooth 9 as a fulcrum, the free edge of the casing will be carried over and backward away from the rim and held in that position to give sufficient clearance for the easy manipulation and fitting of the air tube.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, and desire to secure by Letters Patent, is:—

1. A tire applying tool comprising a lever or body member having a tire engaging end with an angle extension therefrom, a jaw member carried by said angle extension in operative relation to the tire engaging end of said lever and formed at the end remote from the tire engaging end of the lever to grasp one edge of a wheel rim, said end of the jaw member constituting when the tool is in use the fulcrum of the lever, and another lever carried by the body member in traversing relation thereto, said lever having its shorter arm terminating in a tire engaging bill or beak with a stop member at the root of the beak, said bill or beak being in opposing relation to the terminal portion of the jaw member carried by the body member, and adjacent the tire engaging end of said body member and the longer arm of the second named lever being movable toward the first named lever or body member on the active movement of the bill or beak formed on its shorter arm.

2. A tire applying tool comprising a lever or body member having a tire engaging end and an angle extension therefrom, a jaw member carried by said angle extension in operative relation to the tire engaging lever and in slidable connection with said angle extension for varying the effective length of the body member, said jaw member being formed at the free end to grasp one edge of a wheel rim and there constituting a fulcrum for the said lever or body member, and a lever carried by the body member with a shorter end in traversing relation to the body member and terminating in a tire engaging bill or beak with a stop member at the root of the beak, said second named lever being related to the first named lever or body member to have its longer arm movable toward the first named lever in the active operation of the second named lever.

3. A tire applying tool comprising a body member having a handle at one end and at the other end a tire engaging portion and a rim engaging jaw in spaced relation to the tire engaging portion, said jaw constituting a fulcrum member for the said lever, and a lever pivotally connected to the body member in spaced relation to the rim engaging jaw and having its shorter arm at an angle to its longer arm, said shorter arm being in traversing relation to the body member and provided with a bill or beak adapted to engage a tire on the side of the rim remote from that engaged by the jaw on the body member.

4. A tire applying tool comprising a body member having at one end a handle and at the other end a tire engaging portion and in spaced relation to the latter, a rim engaging jaw in operatively rigid relation to said body member, and a supplemental lever of less length than the combined length of the body member and its jaw, said supplemental lever having its longer end constituting a handle movable in operation toward the handle of the body member, and its shorter end in traversing relation to the body member and terminating in a tire engaging bill or beak spaced from the rim engaging jaw of the body member to engage the edge of the tire remote from that adjacent the side of the rim adapted to be engaged by the rim engaging jaw.

5. A tire applying tool comprising a lever or body member having at one end a rim engaging jaw in rigid relation to said lever or body, and a supplemental lever pivoted to the main lever or body and provided with a tire engaging bill or beak spaced from the rim engaging jaw to engage the edge of the tire remote from that adjacent the side of the rim adapted to be engaged by the rim engaging jaw, the said supplemental lever being provided with a lateral offset adapted to engage the main lever or body member.

6. A tire applying tool comprising a lever or body member having at one end a rim engaging jaw in rigid relation to said lever or body, and a supplemental lever pivoted to the main lever or body and provided with a tire engaging bill or beak spaced from the rim engaging jaw to engage the edge of the tire remote from that adjacent the side of the rim adapted to be engaged by the rim engaging jaw, and a latch on the main lever or body member for engaging the supplemental lever when in coincidence with the main lever or body member.

7. A tire applying tool comprising a lever or body member having an angle extension at one end provided with a longitudinally disposed slot and a longitudinal groove coinciding with said slot, a rim engaging jaw having a bar or shank provided with a longitudinal rib adapted to the groove in the angle extension of the body member and also having a longitudinal slot extending through said rib, clamping means traversing the slots in the angle portion of the angle member and the shank of the rim engaging jaw, and a supplemental lever pivotally connected to the main lever or body and having a bill or beak at its shorter end with a lug or stop at the root of the beak, said beak being related to the rim engaging jaw to in turn engage a portion of a tire remote from the portion of the rim engaged by the rim engaging jaw, and a latch member on the lever or body member for locking the supplemental lever when in coincidence with said lever or body member.

8. A tire applying tool comprising a lever or body member having a tire engaging end an angle extension therefrom, a rim engaging jaw carried by and slidable along said angle extension and constituting a fulcrum for the said lever when in engagement with the wheel rim, means for securing the jaw in different positions of adjustment, and a supplemental lever pivoted to the lever or body member at a point substantially coincident with the junction of the said lever or body member and the angle extension thereof, said supplemental lever being provided with a short arm terminating in a bill or beak for engaging the edge of a tire adjacent the side of the rim remote from that engaged by the jaw carried by the angle extension of the lever or body.

9. A tire applying tool comprising a body member having at one end a tire engaging portion and a rim engaging jaw in spaced relation to the tire engaging portion and at the other end formed into a handle, and a lever pivoted to the body member and having one end constituting a handle and the other end formed with tire engaging means, the tire engaging end of the said pivoted lever and the rim engaging end of the body member being spaced to embrace a wheel rim with the engaging end of the lever in operative relation to the edge of a tire when the rim engaging portion of the body member is in engagement with that edge of the rim remote from the portion of the tire engaged by said lever, the body member and lever carried thereby being related to be moved one toward the other in active operation.

In testimony that I claim the foregoing as my own, I have hereto affixed my signature in the presence of two witnesses.

TOWNSEND W. BURT.

Witnesses:
JOHN H. SIGGERS,
DAVID R. WAGNER.